United States Patent [19]

Davis

[11] Patent Number: 5,703,457
[45] Date of Patent: Dec. 30, 1997

[54] POWER SUPPLY TO A STATOR OF A POLYPHASE RELUCTANCE MACHINE

[75] Inventor: Rex Mountford Davis, East Leake, United Kingdom

[73] Assignee: Switched Reluctance Drives, Ltd., Harrogate, United Kingdom

[21] Appl. No.: 501,643

[22] Filed: Jul. 12, 1995

[30] Foreign Application Priority Data

Jul. 13, 1994 [GB] United Kingdom ............ 9414116

[51] Int. Cl.⁶ ........................................ H02P 7/00
[52] U.S. Cl. ........................ 318/701; 318/254
[58] Field of Search ............................. 318/254, 701, 318/716–724, 771

[56] References Cited

U.S. PATENT DOCUMENTS

| | | | |
|---|---|---|---|
| 3,609,492 | 9/1971 | Rakes | 318/254 |
| 3,678,352 | 7/1972 | Bedford | 318/701 |
| 4,338,557 | 7/1982 | Wanlass | 318/729 |
| 4,360,770 | 11/1982 | Ray et al. | 318/701 |
| 4,387,326 | 6/1983 | Ray et al. | 318/701 |
| 4,445,077 | 4/1984 | Kirschner | 318/696 |
| 4,983,902 | 1/1991 | Palaninppan et al. | 318/701 |

*Primary Examiner*—David S. Martin
*Attorney, Agent, or Firm*—Arnold, White & Durkee

[57] ABSTRACT

A polyphase switched reluctance machine has only n power cable connections for n phases. Each phase winding includes a series connected diode and the phase windings and their diodes are arranged in a conducting ring. Alternating currents are fed to the nodes of the conducting ring from an inverter. The nodal connections between the phases allows the alternating current to energize the windings where previously only a greater number of cables and a unidirectional current would have been required. Due to the presence of alternating current, a transformer may be interposed between the inverter and the nodes of the conducting ring to allow a boosted voltage to be delivered over long distances.

23 Claims, 4 Drawing Sheets

Optional module

POWER SUPPLY TO A STATOR OF A POLYPHASE RELUCTANCE MACHINE

FIELD OF THE INVENTION

This invention relates to polyphase reluctance machines.

BACKGROUND OF THE INVENTION

A polyphase switched reluctance machine, running either as a motor or a generator, normally has two electrical connections for each phase between the switching circuitry and each phase winding. Other connection schemes have been proposed, where two or more phases have one connection in common. In these cases the number of electrical connections will be fewer than twice the number of phases but never as few as the number of phases itself. Examples of prior art which illustrate the number of connections required by a switched reluctance machine are illustrated in FIGS. 1 to 3.

FIG. 1 shows a typical converter circuit in which a three-phase switched reluctance motor is chosen for the purposes of illustration. Six electrical connections are required to the motor, shown at the ends of the motor phase windings 11, 12 and 13. Energy is injected into a winding when both switches at the ends of each winding conduct together. Energy is returned from the winding to the dc supply 1 and its dc link capacitor 2 when the two diodes associated with each pair of switches conduct. If one switch and one diode of a phase conduct together, no energy flows to or from the dc supply—this is known as 'freewheeling.' It is desirable to reduce the number of cables required between the machine and its converter circuit since these may be widely separated and the cost of the cables may become a substantial part of the cost of the complete drive. In some applications, the stator may be in a different environment from the cables and there will then be a cost associated with the sealing of each cable entry to the environment. FIG. 2 shows a converter circuit which may be used on a switched reluctance motor having an even number of phases. This circuit requires n+1 electrical terminals for n phases. A given phase receives energy from one of the capacitors 2,3 and from the dc supply when its switch conducts, and returns energy to the other capacitor and to the dc supply when its diode conducts.

FIG. 3 shows a converter circuit for a three-phase switched reluctance machine having four electrical terminals, one of which is common to all three phases. When a switch (e.g. in the form of a transistor) conducts, its phase receives energy from the dc supply 1 and its capacitor 2 but when its diode conducts the phase returns energy to the capacitor 3 and the resistor 4. Alternatively, the energy returned to the capacitor 3, instead of being dissipated in the resistor 4, may be transferred by an additional switching circuit to the dc supply 1 and its capacitor 2. It is an object of the present invention to enable the use of only n electrical connections for an n-phase switched reluctance machine. The invention applies to machines having two or more phases where, at most, only a respectively corresponding number of cables are required according to the invention.

SUMMARY OF THE INVENTION

According to the invention there is provided a polyphase reluctance machine comprising a rotor, a stator, a phase winding for each phase of the machine, and at least one uni-directional current device connected in series with each phase winding to form a phase unit therewith, the phase units being arranged in at least one conducting ring defining nodes at connections between the phase units. Each phase winding of a switched reluctance machine according to the invention has a uni-directional current device connected in series with it to form the phase unit. Two or more phase units are connected in series to form a closed ring in which the conducting directions of the uni-directional current devices allow a current to circulate around the ring. Electrical supply connections to the machine are made at each of the nodes where one phase unit is connected to its neighbor, thus requiring the same number of supply cables as there are phase units.

According to the invention a two-phase motor has two phase units with two cable connections. Similarly according to the invention a three-phase motor has three phase units connected in a delta configuration with three cable connections to the corners (constituting the nodes) of the delta. A four-phase motor has four phase units connected in a four-node configuration with four cable connections to the nodes.

Preferably, the uni-directional current device is a diode. The device may be arranged on one side of its respective phase winding and a further device may be connected to conduct in the same direction on the other side of the same phase winding. Preferably, pairs of commonly connected uni-directional current devices at one of the nodes are formed in a single device package.

In one form, the machine comprises n phases (n>3) and m conducting rings, where m is an integer never greater than n/2 and never less than 2. The m conducting rings may each comprise at least two phase units and may comprise up to n/2 units (n even) or (n+1)/2 units (n odd). Where two or more conducting rings comprise the same number of phase units, their respective nodes may be supplied by the same cable or by separate cables, thus being able to reduce the number of cables to the number of phase units in a conducting ring. When the conducting rings comprise different numbers of phase units, the total number of cables required is still equal to the number of phases.

Thus, also according to the invention the phases of a four-phase motor may be taken in pairs and each pair of phases connected as for a two-phase motor. The invention is equally applicable to machines with more than four phases, for which the phase units may be configured in a polygon with cable connections to the respective nodes, or in a number of rings, such as deltas.

In a particular form, a converter circuit for the machine includes switching circuits having a positive and a negative dc supply terminal, serially connected first and second switch means for each phase of the machine and means for transmitting electrical energy between each node of the conducting ring and the first and second switch means of the switching circuit, the pairs of serially connected switch means being connected across the positive and negative supply terminals.

The means for transmitting electrical energy preferably comprises an electrically conductive line connected from between each of the first and second switch means, and supplying electrical energy to a respective one of the nodes. Preferably, each of the first switch means connected with the positive supply terminal includes a diode connected across the said first switch means to conduct towards the positive supply terminal, and each of the second switch means connected with the negative supply terminal includes a diode connected across the said second switch means to conduct from the negative supply terminal.

Preferably, the converter circuit for the machine includes a snubber capacitor connected across each of the switch means.

Apart from requiring only n connections for n phases the invention has the further benefit in that, in contrast to a conventional switched reluctance drive, where the cables of a phase carry a pulsating unidirectional current, the cables for a switched reluctance drive according to the invention carry equal alternating currents. This has a benefit compared with the circuits in FIG. 2 or 3 in that the sum of the root mean squared (RMS) currents in the cables is less.

Significantly, a transformer can be interposed between the converter circuit and the nodes, i.e. in the cable connections carrying the power to the motor. Where these cables are unusually long, e.g. for a submersible pump operating in a very deep well, it is advantageous to design the motor for higher voltages than are convenient for the power converter so that the motor and its cables carry lower current at higher voltages than those occurring within the converter circuit, the step-up in voltage being performed by the transformer interposed between the converter and the cables supplying the motor.

Also according to the invention there is provided a method of driving a switched reluctance machine as defined above, the method comprising: a) applying a supply voltage across the positive and negative supply terminals; b) initiating a phase conduction cycle by turning on the first switch connected with one of the nodes and a second switch connected with another of the nodes, such that a positive voltage is applied to, and flux increases within, the phase winding between the node; c) turning off the said first and second switch means when the flux in the phase winding between the nodes reaches a required level; d) initiating a subsequent phase conduction cycle by turning on the first switch means connected with the said other node and the second switch means connected with a further one of the nodes adjacent the said other node; and e) sequentially turning on and off the first and second switch means connected with the nodes across successive adjacent phase windings according to steps b) to d) to initiate a sequence of phase conduction cycles. Preferably, the method includes freewheeling the machine by oscillating the first or second switch means between on and off states repeatedly during the respective phase conduction cycle to reduce the average voltage applied to the phase windings.

The supply voltage may be varied as a function of the speed of the motor.

BRIEF DESCRIPTION OF THE DRAWINGS

The present invention can be put into practice in various ways, some of which will now be described by way of example with reference to the accompanying drawings in which.

DETAILED DESCRIPTION OF THE INVENTION

Figure 1:
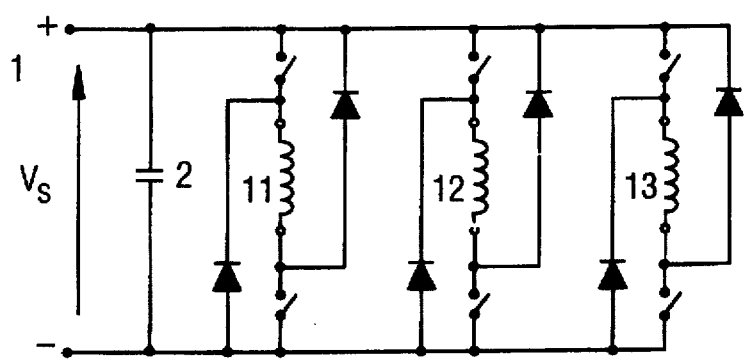
FIG. 1 is a circuit diagram of a typical three-phase switch arrangement for an switched reluctance machine according to the prior art.
Figure 2:
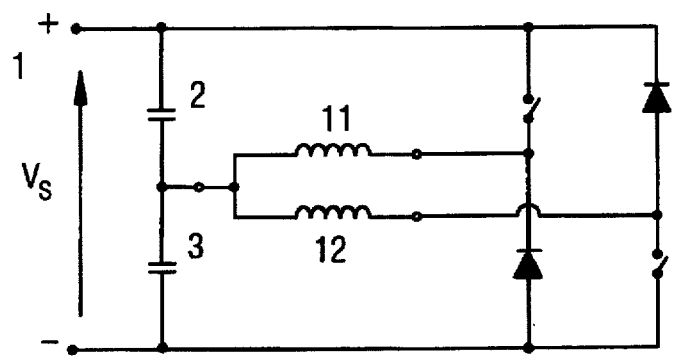
FIG. 2 is a circuit diagram of a two-phase switch arrangement using three connections according to the prior art.
Figure 3:
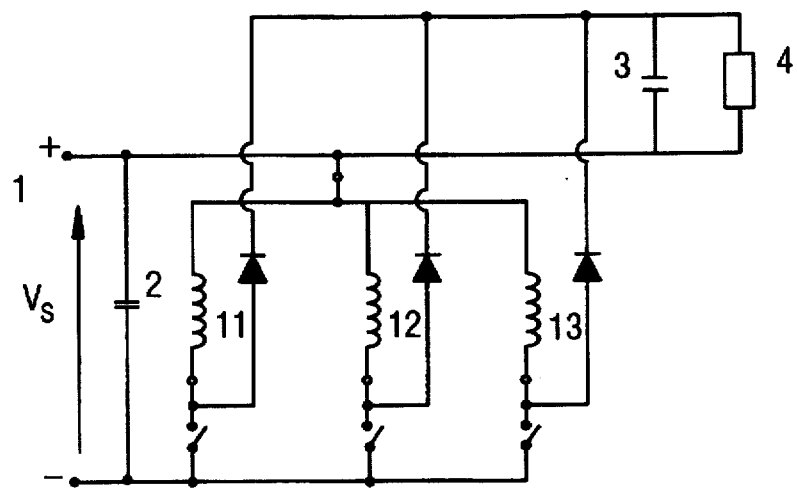
FIG. 3 is a circuit diagram of a three-phase switch arrangement using four connections according to the prior art.
Figure 4:
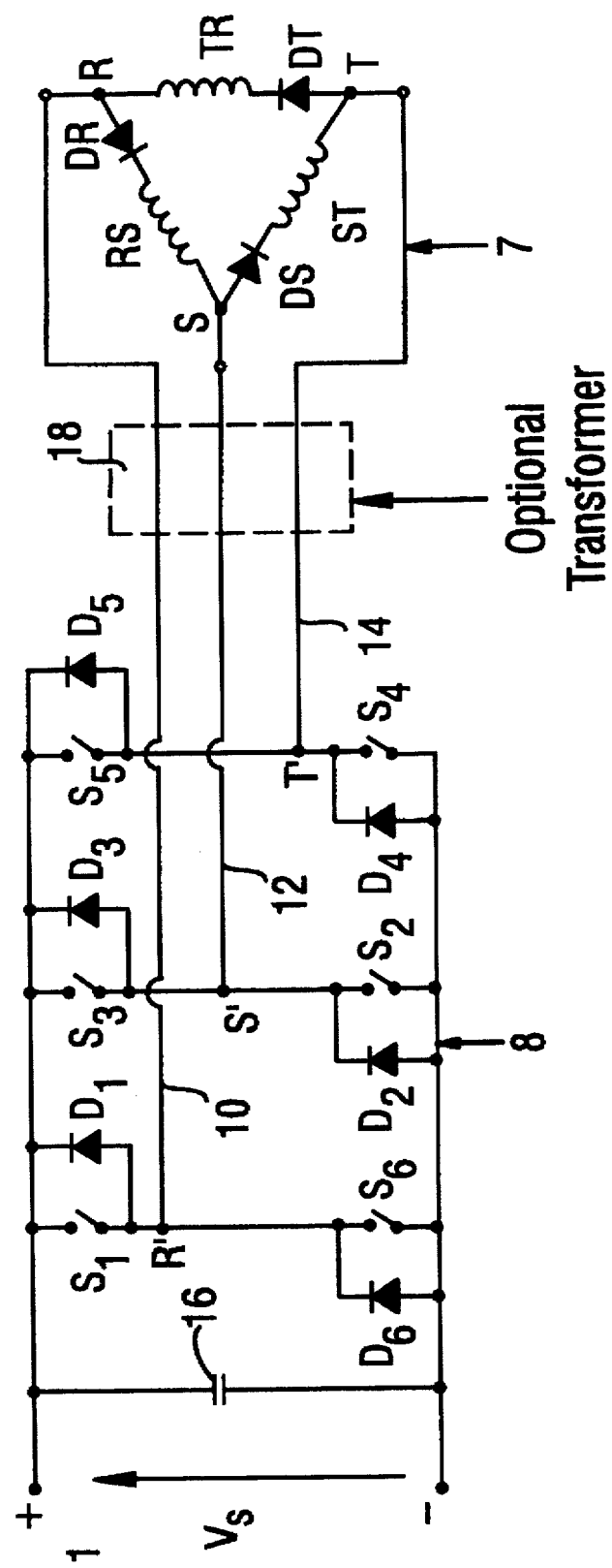
FIG. 4 is a circuit diagram according to the present invention for a three-phase machine using three connections.

Referring to FIG. 4 of the drawings, an inverter 8 is coupled to a three-phase switched reluctance machine 7 by only three electrical supply lines 10, 12 and 14. For the sake of convenience reference is made to a 'motor.'

It will be understood by the skilled person that this invention applies equally to reluctance generators. As such the description below is intended to apply mutatis mutandis to reluctance generators.

In more detail, pairs of serially connected semi-conductor switches $S_1/S_6$; $S_3/S_2$; $S_5/S_4$ are connected in parallel between positive and negative terminals of a supply voltage source $V_s$. A dc link capacitor 16 is also connected across the positive and negative supply terminals. Each of the positive-side switches $S_1$; $S_3$; $S_5$ has a recirculating diode $D_1$; $D_3$; $D_5$ connected across it to conduct towards the positive supply terminal. Each of the negative-side switches $S_6$; $S_2$; $S_4$ has a recirculating diode $D_6$; $D_2$; $D_4$ connected across it to conduct from the negative supply terminal. Single diodes $D_1$–$D_6$ are shown. However, it will be appreciated by the skilled person that two or more diodes could be used, in place of each single diode shown, connected in parallel or in series.

Figure 7:
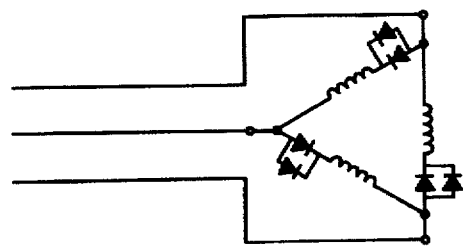
FIG. 7 is a circuit diagram illustrating a phase diode in accordance with the present invention comprising a set of diodes connected in parallel.

The three-phase motor 7 comprises three phase units, each comprising a phase winding RS; ST; TR and a serially connected phase diode DR; DS; DT. Depending on current requirements the phase diode may, in fact, each be a set of diodes connected in parallel as illustrated in FIG. 7. The phase units are connected in a delta configuration with each phase diode connected to conduct toward its winding. Each phase diode may be connected on the other side of its winding to equal effect. The diodes in the delta arrangement are thus arranged to allow current to circulate around the delta. The connections between the phase units define nodes R;S;T. The lines 10, 12 and 14 are each respectively connected between one of each of the nodes and the junction between the switches of one of the pairs of switches of the invertor. Thus, for a three-phase switched reluctance motor winding only the three lines 10, 12 and 14 are needed to supply the winding current.

Figure 8:
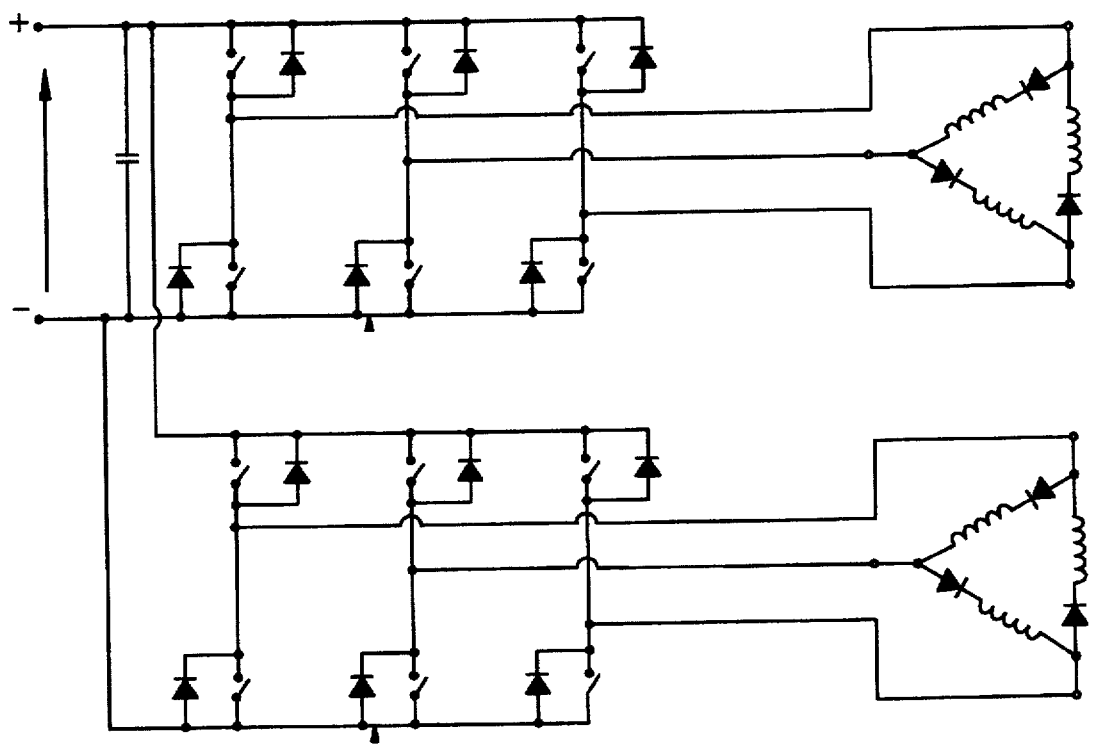
FIG. 8 is a circuit diagram illustrating a six-phase machine subdivided into two delta groups in accordance with the present invention.

It will be appreciated that a motor with a plurality of phases can be split into groups (say a six-phase machine sub-divided into two delta groups, each delta having three phases), as illustrated in FIG. 8. Each delta group may be fed by its own inverter such that there is still only one line per phase of the machine. Actuation of each of the separate inverters can be adjusted relative to the other. This then allows the control of the machine to reduce vibration, acoustic noise and output torque ripple because of the ability to shift the actuation of one set of phases relative to the other.

Hitherto, it has been thought that a standard 3-phase inverter cannot be used for driving switched reluctance machines because it provides alternating currents to the machine, whereas a switched reluctance machine is normally operated with uni-directional current in its windings. With the invention, however, it is possible to use the standard 3-phase inverter circuit to advantage.

The phase units of the machine in this embodiment comprise the winding/diode pairs RS/DR, ST/DS and TR/DT. The connections made to the nodes R, S and T are by cables to the output terminals R', S' and T' of the inverter 8. Alternatively, the inverter terminals R', S' and T' may be connected to the primary of a transformer 18 whose secondary is connected to the cables 10, 12, 14 supplying the motor through the nodes R, S and T.

There are many ways whereby the windings of the machine may be sequentially energized in synchronism with rotor rotation by control of the active semi-conductor switches $S_1-S_6$. Any type of semi-conductor or other switch capable of being turned on and off may be used in the circuit. The diodes $D_1-D_6$ provide for the continuation of current in a connecting cable or transformer winding when a semiconductor switch of the associated phase is turned off.

When one upper and one lower semi-conductor switch (as depicted in FIG. 4) connected to different nodes of the delta ring of phase units are turned on together, e.g. $S_1$ and $S_2$, the phase RS is connected across the dc supply $V_s$ and flux will increase approximately linearly in the magnetic circuit associated with that phase winding. If $S_1$ and $S_2$ are both turned off, the current in the phase RS will transfer to $D_6$ and $D_3$. The polarity of the voltage across the phase RS reverses and the flux associated with the phase RS decreases approximately linearly. It should be noted that while diodes $D_6$ and $D_3$ conduct, a positive potential appears at node S of the motor and a negative potential appears at node R. Thus, the diodes DS and DT are forward biassed and current can increase in phases ST and TR, whilst diodes $D_3$ and $D_6$ remain conductive until current in the diodes DS and DT reaches equality with the currents in the diodes $D_3$ and $D_6$. Thereafter, the currents in RS, ST and TR, being equal, circulate around the delta connected phase units, eventually decaying to zero. A simple method of controlling the switches $S_1-S_6$ will now be described whereby each winding RS, ST and TR receives in turn a positive voltage $V_s$ followed by a negative voltage $-V_s$ followed by a period of zero current.

As an initial condition (corresponding to operation at a motor speed typical of normal operation), the windings TR and RS are assumed to carry equal currents, with the current $I_{RS}$ increasing and the current $I_{TR}$ decreasing. The conduction of $S_1$ and $S_2$ causes $I_{RS}$ to increase, increasing the flux associated with the phase RS approximately linearly. The conduction of $D_4$ and $S_1$, demanded by the current in TR, applies a reverse voltage $-V_s$ to TR, decreasing the flux therein approximately linearly.

When the flux associated with the phase winding RS reaches the value needed for the motor to exert the required torque, the average value of which for all three phases meets the requirements of the load, $S_1$ and $S_2$ are turned off, their current transferring to $D_6$ and $D_3$, respectively. Then, or later, $S_4$ is turned on. In either case a positive voltage $V_s$ is applied to the phase winding ST. $S_3$ could be turned on with $S_4$, or later, but it will carry no current until $I_{ST}$ exceeds $I_{RS}$. Because there is negligible voltage across the switches when they are turned on, the turn-on losses are negligible. $S_3$ should be turned on before $I_{ST}$ has increased to equality with the decreasing $I_{RS}$, to avoid turn-on losses, and $S_4$ should be turned-on before $I_{ST}$ reaches equality with $I_{TR}$.

Table 1 summarizes the conduction of switches $S_1-S_6$ and diodes $D_1-D_6$ with indications of current inequalities and flux variations. These refer to idealized conditions where the machine phase winding resistance and semiconductor voltdrop of the switches are ignored.

TABLE 1

| COLUMN # | 1 | 2 | 3 | 4 | 5 | 6 |
|---|---|---|---|---|---|---|
| CURRENTS IN | TR > RS | RS > TR | RS > ST | ST > RS | ST > TR | TR > ST |
| PHASES | CONDUCTING DEVICES | | | | | |
| RS | $D_1 + S_2$ | $T_1 + S_2$ | $D_3 + D_6$ | $S_3 + D_6$ | $D_5 + D_2$ | $S_5 + D_2$ |
| ST | | | $D_3 + S_4$ | $S_3 + S_4$ | | |
| TR | $D_1 + D_4$ | $S_1 + D_4$ | | | $D_5 + S_6$ | $S_5 + S_6$ |
| FLUXES | | | | | | |

Two points should be noted with respect to Table 1:
1) The flux wave forms are correctly related to the conducting devices, but the incidence of current equality and flux equality will not generally coincide;
2) The conduction sequence refers to a particular direction of machine rotation and a different sequence is required for the opposite direction of rotation which will be apparent to the skilled person.

Since a flux change is proportional to the product of voltage applied to a phase and the time for which the voltage is applied, it is clear that if the motor speed is halved, the times of voltage application for given switching angles double and if the flux change is not to vary, the voltage $V_s$ must be broadly proportional to motor speed. This implies that the dc voltage $V_s$ on FIG. 4 must be capable of being sufficiently varied over a wide range.

Figure 5:
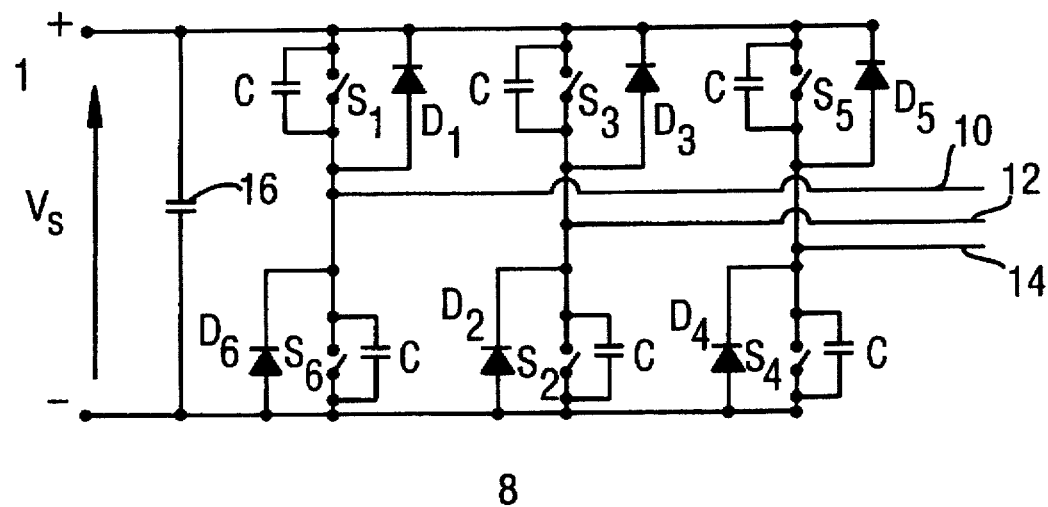
FIG. 5 is a circuit diagram of a converter circuit suitable for supplying a switched reluctance machine according to the present invention, and showing snubbing capacitors.

The inverter circuit of FIG. 5 offers the opportunity greatly to reduce the switch-off losses in the switches $S_1-S_6$. Like components are indicated by the corresponding numbering in FIG. 4. The conducting lines 10, 12 and 14 are connected to their respective nodes as shown in FIG. 4 with or without the transformer 18. Since with the conduction sequence of Table 1 the conduction of the diode, e.g. $D_2$, always precedes the conduction of the switch, e.g. $S_2$, it is possible to place snubber capacitors across each switch. This is illustrated by way of example by the snubber capacitors C connected in parallel across the switches $S_1-S_6$. The presence of the capacitor C across each switch ensures that the voltage across it at turn off is virtually zero because the switch current transfers to the snubber capacitor C. Turn-off losses are thus virtually eliminated. The cable current which was flowing through one of the switches, say $S_6$, firstly transfers to the parallel snubber capacitor C, the voltage across which increases until the opposite diode, $D_1$, is forward-biased whereupon the cable current transfers to this diode.

If the method described above for reducing turn-off losses is not required, more complex conduction patterns, which may provide extra facilities in the way the machine phases are energized, may be employed. For example, during the time when the current in one phase is decreasing and the current in a second subsequent phase (in order of rotor rotation) is increasing and is larger than that in the first phase, an opportunity exists for temporarily freewheeling the phase currents. Referring to the columns of Table 1, the above condition is satisfied for columns 2, 4 and 6. If, during one of these intervals the top switch is turned off. (i.e. $S_1$, $S_3$ or $S_5$, as appropriate), when it (and its associated switch) have previously both been conducting, the associated diode (i.e. $D_6$, $D_2$ or $D_4$, as appropriate) will conduct. Thus, all the nodes R, S and T of the motor will be at the potential of the negative dc supply and hence the motor phase currents will be circulating in a freewheeling mode. If the top switch is turned off and on repeatedly during these intervals the average voltage applied to the motor phases can be reduced without the need for reducing the voltage $V_r$. The repeated off/on switching reduces the average positive voltage applied to the phase winding whose current is increasing and also the average negative voltage applied to the phase winding whose current is decreasing.

Figure 6:
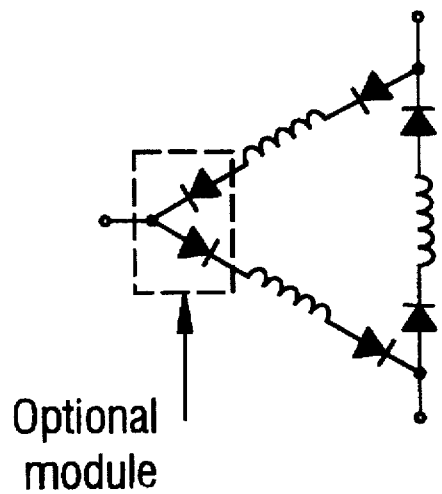
FIG. 6 is a diagram of an alternative machine winding arrangement for use in the circuit of FIG. 4.

A variety of switching patterns will be apparent to one skilled in the art, each having its own advantages for machine control. In all cases, the advantageous use of only one connecting wire per phase according to the invention is realized. A further embodiment of the invention is to use two diodes per phase unit, connected as shown in FIG. 6. Each phase unit has a diode at each end of the phase winding, with both diodes arranged to conduct in the same direction as the original diode. This can have advantages in allowing the diodes to share the voltage across the phase unit on high voltage systems. Optionally, adjacent diodes can be contained in a single module 20 as shown in FIG. 6.

While the invention has been described in connection with the illustrative embodiments discussed above, those skilled in the art will recognize that many variations may be made without departing from the present invention. For example, machines such as reluctance machines can be constructed as linear motors in which the moving member is often referred to as a rotor. The term 'rotor' herein is intended to embrace such moving members of linear motors. Accordingly, the above description of several embodiments is made by way of example and not for purposes of limitation. The present invention is intended to be limited only by the spirit and scope of the following claims.

What is claimed is:

1. A stator for a polyphase reluctance machine comprising a stator body, a phase winding for each phase of the machine, and at least one uni-directional current device connected in series with each phase winding to form a phase unit therewith, the uni-directional current device adapted to carry the main phase winding current of its associated phase winding when the associated phase winding is energized, the phase units being arranged in at least one conducting ring defining nodes of connections between the phase units.

2. A stator as claimed in claim 1 comprising n phases where n is an odd integer greater than 4, and m conducting rings where m is an integer in the range from 2 to (n+1)/2 units.

3. A stator as claimed in claim 1 in which the at least one uni-directional current device is a diode.

4. A stator as claimed in claim 3 in which at least one phase unit includes two or more diodes connected in series with a phase winding.

5. A stator as claimed in claim 3 in which at least one phase unit includes two or more diodes connected in parallel.

6. A stator as claimed in claim 1 in which each phase unit further comprises a further uni-directional current device connected to an end of the phase winding opposite the at least one uni-directional current device.

7. A stator as claimed in claim 6 in which a pair of the uni-directional current devices connected at one of the nodes is formed in a single device package.

8. A stator as claimed in claim 1 in which the phase units are arranged into a plurality of separate conducting rings.

9. A stator as claimed in claim 1 comprising n phases where n is an even integer greater than 3, and m conducting rings where m is an integer in the range from 2 to n/2 units.

10. A stator as claimed in claim 9 in which at least two conducting rings comprise the same number of phase units and the nodes of each are respectively connected together.

11. A stator as claimed in claim 1 further including a switching circuit having positive and negative dc supply terminals, serially connected first and second switch means for each node and means for transmitting electrical energy between each node of the conducting ring and the first and second switch means of the switching circuit, the pairs of serially connected switch means being connected across the positive and negative supply terminals.

12. A stator as claimed in claim 11 in which the means for transmitting electrical energy include an electrically conductive line connected between each of the first and second switch means and the corresponding node such that the switching circuit is connected by one of the said lines to the corresponding node.

13. A stator as claimed in claim 11 in which each of the first switch means connected with the positive supply terminal includes a diode connected across the said first switch means to conduct towards the positive supply terminal and each of the second switch means connected with a negative supply terminal includes a diode connected across the said second switch means to conduct from the negative supply terminal.

14. A stator as claimed in claim 13 in which a snubber capacitor is connected across each of the switch means.

15. A stator as claimed in claim 14 in which the means for transmitting electrical energy include a transformer.

16. A stator as claimed in claim 8, further including a separately actuatable switching circuit for each conduction ring.

17. A polyphase reluctance machine comprising a rotor and a stator, the stator comprising a stator body, a phase winding for each phase of the machine, and at least one uni-directional current device connected in series with each phase winding to form a phase unit therewith, the uni-directional current device being adapted to carry the main phase winding current of its associated phase winding when the associated phase winding is energized, the phase units being arranged in at least one conducting ring, the conducting ring defining nodes between the phase units.

18. A method of driving a switched reluctance machine having a stator, the stator comprising a stator body; a phase winding for each phase of the machine; at least one uni-directional current device connected in series with each phase winding to form a phase unit therewith, the unidirectional current device adapted to carry the main phase winding current of its associated phase winding when the associated phase winding is energized, the phase units being arranged in at least one conducting ring defining nodes of connections between the phase units; and a switching circuit having positive and negative dc supply terminals, serially connected first and second switch means for each node, and means for transmitting electrical energy between each node of the conducting ring and the first and second switch means of the switching circuit, the pairs of serially connected switch means being connected across the positive and negative supply terminals, the method comprising;

(a) applying a supply voltage across the positive and negative supply terminals;

(b) initiating a phase conduction cycle by turning on the first switch means connected with one of the nodes and the second switch means connected with another of the nodes, such that a positive voltage is applied to, and flux increases within the magnetic circuit associated with, the phase winding between the nodes;

(c) turning off the said first and second switch means when the flux associated with the phase winding between the nodes reaches a required level;

(d) initiating a subsequent phase conduction cycle by turning on the first switch means connected with the said another of the nodes and the second switch means connected with a further one of the nodes adjacent the said another of the nodes, such that a positive voltage is applied across the adjacent phase winding between those nodes; and (e) sequentially turning on and off the first and second switch means connected with the nodes of successive adjacent phase units according to steps b) to d) to initiate a cyclic sequence of phase conduction cycles.

19. A method as claimed in claim 18, including freewheeling the current in a phase unit by oscillating the first or second switch means between on and off states repeatedly during a respective phase conduction cycle to reduce the average voltage applied to the phase winding in the cycle.

20. A method as claimed in claim 19, including alternating between oscillating the first and second switch means to effect freewheeling.

21. A method as claimed in claim 18 in which the dc supply voltage is varied as a function of the speed of the motor.

22. A method as claimed in claim 19 in which the dc supply voltage is varied as a function of the speed of the motor.

23. A stator as claimed in claim 2 in which at least two conducting rings comprise the same number of phase units and the nodes of each are respectively connected together.

* * * * *